ABSTRACT OF THE DISCLOSURE

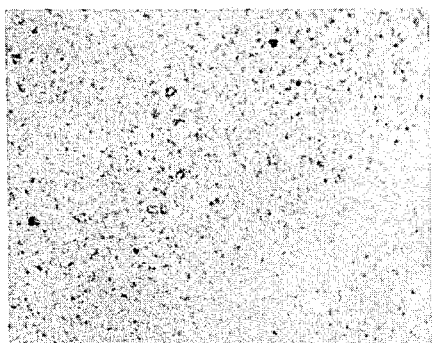
X420 FIG. 1.
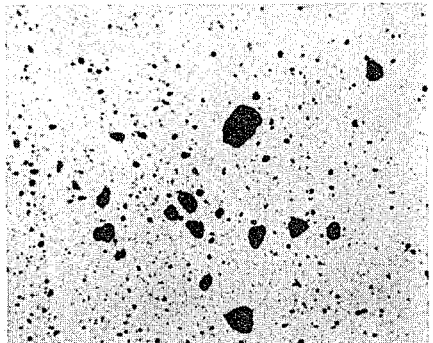
X132 FIG. 2.
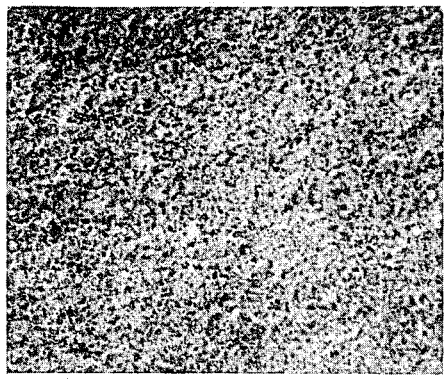
X420 FIG. 3.
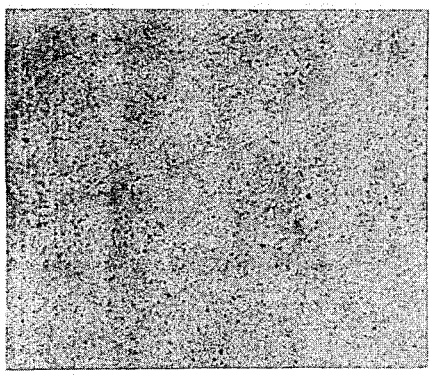
X420 FIG. 4.
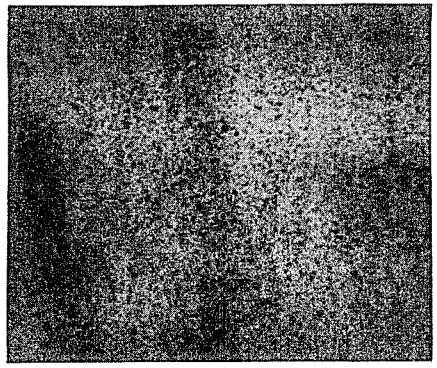
X420 FIG. 5.

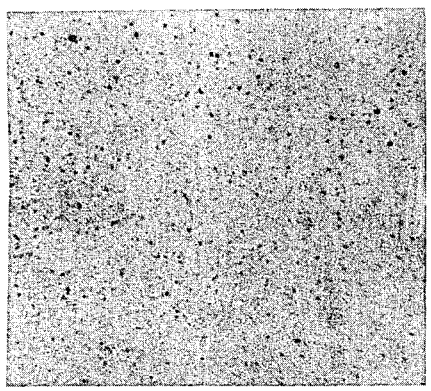
X 420  FIG. 6.
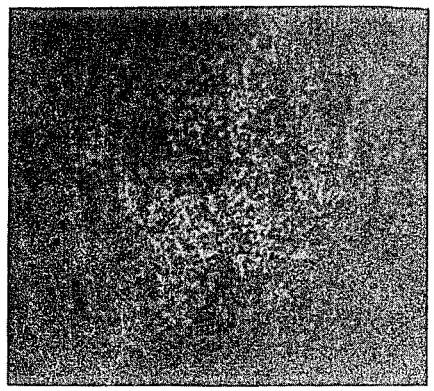
X 420  FIG. 7.
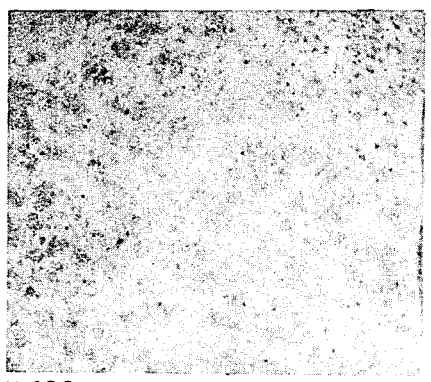
X 420  FIG. 8.
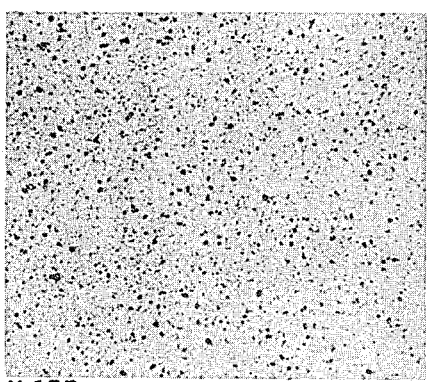
X 420  FIG. 9.
X 300  FIG. 10.
X 420  FIG. 11.
INVENTOR
FRANCIS J. FIGIEL
ATTORNEY 3,663,475
NOVEL DIAMOND POWDER DISPERSIONS AND
PROCESS FOR OBTAINING SAME
Francis J. Figiel, Boonton, N.J., assignor to Allied
Chemical Corporation, New York, N.Y.
Continuation-in-part of application Ser. No. 651,354,
July 3, 1967. This application Mar. 6, 1970, Ser.
No. 17,319
Int. Cl. B01j 13/00
U.S. Cl. 252—309
20 Claims

This application is directed to dispersions of synthetic shock-formed diamond powder and to the method of obtaining same by subjecting a mixture of synthetic shock-formed diamond powder in a liquid dispersion medium to shear stresses. The preferred dispersions are stable for at least 24 hours. The diamond powder used is characterized by an average particle diameter range of from about $7 \times 10^{-4}$ to about $1 \times 10^{-2}$ microns and a surface area of between about 40 and about 400 square meters per gram.

CROSS-REFERENCE TO RELATED APPLICATION

This application is a continuation-in-part of my prior application, Ser. No. 651,354, filed July 3, 1967, now abandoned. The application relates to novel dispersions of synthetic shock-formed diamonds and to the method of preparing same.

BACKGROUND OF THE INVENTION

Synthetic shock-formed diamonds are known in the art. Such diamonds can be obtained, for example, by processes such as that described in U.S. Pat. No. 3,238,- 019. The diamonds made by this particular process are characterized by being a powder composed of individual diamond particles having an average diameter in the range from about $7 \times 10^{-4}$ to about $1 \times 10^{-2}$ microns and a surface area between about 40 and about 400 square meters per gram. At least 10% of the surface area contains hydroxyl, carboxyl and carbonyl functional groups. The diamond powder is contaminated with agglomerates of graphite, silicious matter and particles of diamond strongly agglomerated together, the agglomerates having an average diameter of about 1–5 microns. The synthetic diamond powder is more particularly described in U.S. Pat. No. 3,422,032, issued Jan. 14, 1969. Although the synthetic diamond powder described in the above-identified prior specification is preferred, any shock-formed synthetic diamonds within the specified particle size range can be used.

Examples of uses of such synthetic shock-formed diamond powder are as an abradant in lapping compositions and as a wear resistant element incorporated in metal and in plastic surfaces. For these uses, and for many other uses not herein mentioned, it is highly desirable to disperse the diamond powder uniformly in a liquid dispersion medium. Such a dispersion can be used directly as a lapping compound or can be employed as an intermediate stage in the formation of materials having wear resistant surfaces. For example, the dispersion can be formed in a polymerizable liquid which is then polymerized to form a solid so as to incorporate the diamond powder therein. Or, the dispersion can be added to a metal plating bath, such as an acid nickel plating bath, so as to codeposit both metal and diamond on a substrate.

Furthermore, for these and many other uses, it is necessary to break up the large diamond aggregates into their smaller component parts or to separate the aggregates from the smaller particles. This is necessary since for many applications the aggregates are too coarse to serve as an abradant and when used, result in a scratched and unacceptable surface. Many different techniques were tried in order to form synthetic diamond dispersions having particles of uniform size range, i.e. without the aggregates. However, it was found that it was not possible by known techniques to segregate diamonds on a large scale or in high concentrations or to break up the aggregates so as to make segregation unnecessary.

It was further found that there was no known way to make a stable dispersion in which the concentration of the synthetic diamonds equaled or exceeded about 0.5% by weight. For example, addition of peptizable colloids like gelatin, gum arabic, or soap did not prevent flocculation after short standings of even a 1% by weight of synthetic diamond powder in liquid medium. It was found that there was no way to form stable dispersions of useful quantities of diamond powder in, for example, olive oil, water, glycol or Varsol (a trademark for a mixture of petroleum naphthas having an initial boiling point of about 319–330° F., a final boiling point of about 390– 391° F. and from about 15 to about 30 weight percent aromatics) using conventional agitation methods such as propeller mixers, hand or automatic mortars, ball mills or even ultrasonic waves. When prepared by such means, the mixtures of diamond powder in liquid medium showed poor qualities of stability even at low diamond concentrations. For example, no known mixture containing 0.5% or more by weight of diamonds was able to remain without flocculation over about 12 hours. Furthermore, it was found that large agglomerates remained in the mixtures even, for example, after exposing the diamond material to a ball mill for a long period of time.

The term "stable," as used in this specification and in the appended claims, means that after agitation has ceased, the diamonds remain dispersed in the liquid dispersion medium without any substantial settling for at least about 24 hours. The terms "dispersed" and "dispersion" mean the condition in which the diamond particles are each surrounded by molecules of dispersion medium and, for the most part, do not touch each other.

SUMMARY OF THE INVENTION

It is an object of this invention to produce diamond dispersions containing diamond powder in amounts ranging from about 0.5 to about 20% by weight of the liquid dispersion medium.

It is another object of this invention to provide diamond dispersions which are stable for periods of at least about 24 hours, and in many cases for significantly longer periods.

It is also an object of this invention to provide a readily practicable method for obtaining such dispersions.

It is a further object of this invention to provide diamond dispersions without large agglomerates so that fine surfaces may be polished without leaving unacceptable scratches thereon.

Other and further objects of this invention will be obvious to those skilled in the art from a reading of the following specification and claims.

Applicant has now found that dispersions of up to about 20% by weight of synthetic shock-formed diamond powder can be obtained by subjecting a mixture of synthetic diamond powder in a liquid dispersion medium to shear stresses of at least about 1 watt per cc. for a period of at least about two minutes. The dispersions of this invention contain from about 0.5 to about 20% by weight of diamond powder, based on weight of the dispersion medium, preferably from about 3 to about 10 percent by weight. The liquid dispersion medium selected should have a viscosity between about 0.2 and about 100 centipoises, preferably between about 0.4 and about 5 centipoises. Dispersions can be formed in more viscous materials if, upon heating, the materials can be brought within the specified viscosity range. The liquid dispersion medium should have a surface tension above about 18 dynes per centimeter and preferably between about 45 to about 85 dynes per centimeter. However, for liquids having a surface tension below about 35 dynes per centimeter, it is preferred that a suitable surfactant be employed therewith.

The amount of diamond powder added to the liquid dispersion medium before exposing the mixture to the shear stresses should generally be up to about 20 grams per 100 grams of liquid, preferably from about 3 to about 10 grams per 100 grams of liquid.

The temperature at which the shear stresses are applied is not critical as long as it is sufficient to maintain the dispersion medium in the liquid phase and within the above viscosity range. However, a temperature of at least about 100° F. is preferred.

The shear stresses can be applied to the mixture of diamonds in liquid dispersion medium in a variety of ways. For example, conventional homogenizers or high-speed commercial or household blenders can be used. The household blender is preferred because of its inexpensiveness and ready availability. However, it should be noted that this listing is merely exemplary and not intended to be limited and that any equipment which produces shear stresses within the criteria set forth herein can also be used.

The energy supplied to the diamond-liquid mixture in the form of shear stresses may be in the range from about 250 to about 1000 watts, preferably between about 400 and about 500 watts for a charge of diamond containing liquid having a volume from about 50 to about 300 cc., i.e. a minimum of about 1 watt per cc. The speed at which this energy is applied to the charge is dependent upon the particular means used to generate the shearing stresses. Generally the speed is at least about 8,000 r.p.m., preferably between about 15,000 and about 20,000 r.p.m. maximum shearing stress is preferably about 10 watts per cc.

The time required to form a dispersion depends upon the concentration of the diamond powder and upon the particular dispersion medium employed. Generally the energy is applied to the charge for a period of at least about 2 minutes up to about 60 minutes. The maximum time, however, is not critical. The energy can be applied for greater than 60 minutes and can continue to be applied even after the dispersion has formed. Preferably the energy is applied to the charge for about 10 to about 20 minutes.

Some of the dispersion medium may evaporate due to heat generated in producing the shearing stresses. If this occurs, dispersion medium may be added to make up for the volume lost. It has been found that synthetic shock-formed diamond powder dispersions can be prepared in just about any liquid medium having the viscosity and surface tension characteristics outlined above, and these dispersions are stable for at least about 24 hours, with the proviso that when the liquid medium is water, the pH of the water must be maintained between about 1 and about 12 in order to form a dispersion, and in order for the dispersion to be stable for at least about 24 hours, the pH of the water must be between about 4.5 and about 10.2, preferably between about 7.0 and about 8.5.

With the exception of aqueous dispersions having a pH outside the range of 4.5 and 10.2, the dispersions of this invention can stand for at least about 24 hours before exhibiting phase separation or settling. The settling, however, does not amount to sedimentation and the diamond powder remains dispersed within the previously defined meaning of the term. Such settled dispersions are easily restored to their original condition by simple stirring or shaking and then do not resettle again for prolonged periods, i.e. at least about 24 hours. When the liquid medium is water having a pH outside the range of 4.5 to 10.2, then the original settling and the subsequent resettling may occur sooner than 24 hours. The further the pH of the water is from the 4.5 to 10.2 range, the sooner the settling and resettling will occur.

Suitable liquid mediums for use in this invention include petroleum fractions having a viscosity of about 0.2 to about 100 centipoises, such as naphthas, e.g. Varsol, and kerosene; saturated aliphatic polyhydric alcohols having a viscosity of about 0.2 to about 100 centipoises such as ethylene glycol and glycerine; alkoxyalkanols having a viscosity of about 0.2 to about 100 centipoises, such as 2-butoxyethanol and secondary butoxyethanol; hydrocarbons having a viscosity of about 0.2 to about 100 centipoises, such as hexane, dodecane, hexene, dodecene, benzene and xylene; saturated monohydric alcohols having a viscosity of about 0.2 to about 100 centipoises, such as methanol and hexanol; as well as water, olive oil, and mixtures of the above mediums.

As stated above, when the surface tension of the dispersion medium used is below about 35 dynes per cm., a suitable surfactant should preferably be used in order to obtain dispersions which are stable for at least about 24 hours. Such a surfactant should be added in the amount of from about 0 to 15% by weight, based on the weight of the dispersion medium, preferably from about 2 to about 4% by weight. The surfactant is preferably of the anionic type, such as an alkyl aryl sulfonate or an organic phosphate ester. Examples of alkyl aryl sulfonates include amine dodecylbenzenesulfonates, e.g. the trademarked products EMCOL P-10-59 and EMCOL P-5900; and isopropyl amine salts of an alkyl aryl sulfonic acid, e.g. Nacconol 98 SA, a trademarked product. Examples of organic phosphate esters include the mono- or di-ester phosphates of hydroxylterminated alkoxide condensates, e.g. EMCOL PA-70A, a trademarked product.

This invention may be used to disperse synthetic shock-formed diamond powder in a metal plating bath, such as an acid nickel bath, so as to be able to codeposit the diamond powder and the metal on a substrate. The diamond powder is first dispersed in water or in a portion of plating bath solution of suitable pH, using the method of this invention. The dispersion is then added to the bulk of the plating bath. Conventional agitation of the plating bath, e.g. air agitation, is then sufficient to keep the dispersion from settling.

The following is a description of a technique which is exemplary of the preferred embodiment of the novel method of this invention:

A charge of about 200 to about 210 cc. of olive oil or other suitable dispersion medium is introduced into the removable jar of a household blender having a 1 liter capacity bowl, 4-one inch long blades and a variable speed ¼ HP motor. About 0.08 to about 0.10 gram of synthetic diamond powder, made by the process of U.S. Pat. 3,238,-019, per cc. of charge is added to the olive oil and the blender is switched on and run for about 10 to 20 minutes at about 15,000 to about 20,000 r.p.m. The resultant dispersion in olive oil is stable for about a week.

Dispersions of diamond powder, from the process of U.S. Pat. 3,238,019, were prepared according to substantially the above procedure using independently glycol, water of pH 10.1 and Varsol plus about 4.0% by weight surfactant (EMCOL P-10-59). All of these dispersions were found to be stable for over 24 hours.

The following figures are photomicrographs which compare applicant's novel dispersions with dispersions made by prior art techniques. The degree of magnification is indicated on each figure.

FIG. 1 is a photomicrograph of dispersed synthetic diamonds in olive oil, the diamonds being present in 0.5% concentration by weight. This figure shows the pronounced effect of shearing stressses in breaking up agglomerates and ensuring a uniform dispersion. The diamonds were dispersed by applicant's above-described technique.

FIG. 2 is a photomicrograph of dispersed synthetic diamonds in olive oil, 0.1% concentration by weight. This dispersion shows the agglomerates which were still present after 8 hours of operation on the dispersion of a Spex Mixer Mill, a type of ball mill.

FIG. 3 is a photomicrograph of an 8% concentration of synthetic diamonds dispersed in olive oil by the use of applicant's above-described technique.

FIGS. 4 and 5 are photomicrographs of synthetic diamonds dispersed in water having a pH of 10.1 by the above technique. FIG. 4 shows a 0.5% concentration by weight and FIG. 5 shows an 8% concentration by weight.

FIGS. 6 and 7 are photomicrographs of synthetic diamonds dispersed in Varsol by the above technique using a surfactant, EMCOL P-10-59. FIG. 6 shows a 0.5% concentration and FIG. 7 shows an 8% concentration.

FIG. 8 is a photomicrograph of settled but still dispersed synthetic diamonds in Varsol at 0.5% concentration. The dispersion was prepared by the above technique and then allowed to stand for about 16 hours.

FIG. 9 is a photomicrograph of the same synthetic diamonds as FIG. 8 after redispersion by simple shaking.

FIG. 10 is a photomicrograph of a 0.1% concentration of dispersed synthetic diamonds in water at pH 10.1. The agglomerates which are still present after 6 hours of Spex Mixer Mill operation on the dispersion are apparent.

FIG. 11, by comparison, is a photomicrograph of dispersed synthetic diamonds in water at pH 10.1, 0.5% concentration, prepared by the above technique. This figure shows the pronounced effect of shearing stresses in breaking up agglomerates which are not broken up by other methods.

Although this application has been described with respect to certain particular embodiments, it is to be understood that these are merely exemplary and not limiting and that applicant's invention is limited solely by the scope of the appended claims.

I claim:

1. A liquid dispersion consisting of a liquid dispersion medium and shock-formed synthetic diamond powder in amount ranging from 0.5 to about 20% by weight of the liquid dispersion medium, said synthetic diamond powder having an average particle diameter ranging from about $7 \times 10^{-4}$ to about $1 \times 10^{-2}$ microns and a surface area between about 40 and about 400 square meters per gram, and said liquid medium having a viscosity between about 0.2 and 100 centipoises and being selected from the group consisting of saturated aliphatic polyhydric alcohols, alkoxyalkanols, hydrocarbons, saturated monohydric alcohols, water, olive oil and mixtures thereof, with the proviso that when the liquid dispersion medium is water, the water has a pH between about 1 and about 12.

2. The dispersion of claim 1 wherein said synthetic diamond powder has at least about 10% of its surface area containing hydroxyl, carboxyl and carbonyl functional groups.

3. The dispersion of claim 1 wherein the liquid dispersion medium is water having a pH between about 1 and about 12.

4. A liquid dispersion consisting of a liquid dispersion medium and shock-formed synthetic diamond powder in amount ranging from 0.5 to about 20% by weight of the liquid dispersion medium, said synthetic diamond powder having an average particle diameter ranging from about $7 \times 10^{-4}$ to about $1 \times 10^{-2}$ microns and a surface area between about 40 and about 400 square meters per gram, said liquid medium having a viscosity between about 0.2 and 100 centipoises and being selected from the group consisting of saturated aliphatic polyhydric alcohols, alkoxyalkanols, hydrocarbons, saturated monohydric alcohols, water, olive oil and mixtures thereof, and said dispersion being stable for at least about 24 hours, with the proviso that when the liquid dispersion medium is water, the water has a pH between about 4.5 and about 10.2.

5. The dispersion of claim 4 wherein said synthetic diamond powder has at least about 10% of its surface area containing hydroxyl, carboxyl and carbonyl functional groups.

6. The dispersion of claim 4 wherein the dispersion medium has a viscosity between about 0.4 centipoise and about 5 centipoises.

7. The dispersion of claim 4 wherein the dispersion medium is water having a pH between about 4.5 and about 10.2.

8. The dispersion of claim 4 wherein the dispersion medium is ethylene glycol.

9. The dispersion of claim 4 wherein the dispersion medium is a petroleum naphtha or mixture of petroleum naphthas.

10. The dispersion of claim 4 wherein the dispersion medium is kerosene.

11. The dispersion of claim 4 wherein the synthetic diamond powder is present in amounts ranging from about 3 to about 10% by weight of the liquid dispersion medium.

12. The dispersion of claim 11 wherein the dispersion medium is olive oil, said dispersion being stable for about one week.

13. The method of preparing dispersions of up to about 20% by weight of synthetic shock-formed diamond powder in a liquid dispersion medium, which comprises subjecting a charge of synthetic diamond powder in liquid dispersion to at least about 1 watt of shear stresses per cc. of dispersion medium for a period of at least about 2 minutes, said synthetic diamond powder having an average particle diameter of from about $7 \times 10^{-4}$ to about $1 \times 10^{-2}$ microns and a surface area of between about 40 and about 400 square meters per gram, said liquid medium having a viscosity between about 0.2 and about 100 centipoises and being selected from the group consisting of saturated aliphatic polyhydric alcohols, alkoxyalkanols, hydrocarbons, saturated monohydric alcohols, water, olive oil and mixtures thereof, and said charge of diamond powder comprising up to about 20% by weight of the dispersion medium, with the proviso that when the liquid medium is water, the pH of the water is between about 1 and about 12.

14. The method of preparing dispersions of up to about 20% by weight of synthetic shock-formed diamond powder in a liquid dispersion medium, which comprises subjecting a charge of synthetic diamond powder in liquid dispersion to at least about 1 watt of shear stresses per cc. of dispersion medium for a period of at least about 2 minutes, said synthetic diamond powder having an average particle diameter of from about $7 \times 10^{-4}$ to about $1 \times 10^{-2}$ microns and a surface area of between about 40 and about 400 square meters per gram, said liquid medium having a viscosity between about 0.2 and about 100 centipoises and being selected from the group consisting of saturated aliphatic polyhydric alcohols, alkoxyalkanols, hydrocarbons, saturated monohydric alcohols, water, olive oil and mixtures thereof, said charge of diamond powder comprising up to about 20% by weight of the dispersion medium, and said dispersion being stable for at least about 24 hours, with the proviso that when the liquid medium is water, the pH of the water is between about 4.5 and about 10.2.

15. The method of claim 14 wherein the said synthetic diamond powder has at least about 10% of its surface area containing hydroxyl, carboxyl and carbonyl functional groups.

16. The method of claim 14 wherein the dispersion medium has a viscosity between about 0.4 centipoise and about 5 centipoises.

17. The method of claim 14 wherein the shear stresses are applied over a period of from about 2 to about 60 minutes.

18. The method of claim 17 wherein the period is from about 10 to about 20 minutes.

19. A liquid dispersion consisting of (1) a liquid dispersion medium, (2) a surfactant and (3) shock-formed synthetic diamond powder in amount ranging from 0.5 to about 20% by weight of the liquid dispersion medium said synthetic diamond powder having an average particle diameter ranging from about $7 \times 10^{-4}$ to about $1 \times 10^{-2}$ microns and a surface area between about 40 and about 400 square meters per gram, and said liquid medium having a viscosity between about 0.2 and 100 centipoises and being selected from the group consisting of saturated aliphatic polyhydric alcohols, alkoxyalkanols, hydrocarbons, saturated monohydric alcohols, water, olive oil and mixtures thereof, with the proviso that when the liquid dispersion medium is water, the water has a pH between about 1 and about 12.

20. A liquid dispersion consisting of (1) a liquid dispersion medium, (2) a surfactant, and (3) shock-formed synthetic diamond powder in amount ranging from 0.5 to about 20% by weight of the liquid dispersion medium, said synthetic diamond powder having an average particle diameter ranging from about $7 \times 10^{-4}$ to about $1 \times 10^{-2}$ microns and a surface area between about 40 and about 400 square meters per gram, said liquid medium having a viscosity between about 0.2 and 100 centipoises and being selected from the group consisting of saturated aliphatic polyhydric alcohols, alkoxyalkanols, hydrocarbons, saturated monohydric alcohols, water, olive oil and mixtures thereof, and said dispersion being stable for at least about 24 hours, with the proviso that when the liquid dispersion medium is water, the water has a pH between about 4.5 and about 10.2.

References Cited

UNITED STATES PATENTS

| | | | |
|---|---|---|---|
| 2,944,879 | 7/1960 | Allen et al. | 51—306 X |
| 2,783,137 | 2/1957 | Roth | 51—306 X |
| 1,992,938 | 3/1935 | Chambers et al. | 252—314 |
| 2,889,215 | 6/1959 | Nelson | 51—306 X |
| 3,422,032 | 1/1969 | Figiel et al. | 252—444 |

RICHARD D. LOVERING, Primary Examiner

U.S. Cl. X.R.

51—306, 307; 106—1; 241—46.02, 46.11; 252—314